US010538449B2

(12) United States Patent
De Angelis et al.

(10) Patent No.: US 10,538,449 B2
(45) Date of Patent: Jan. 21, 2020

(54) APPARATUS AND METHOD FOR CONDITIONING MOLTEN GLASS

(71) Applicant: Corning Incorporated, Corning, NY (US)

(72) Inventors: Gilbert De Angelis, Lindley, NY (US); Pierre Laronze, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 59 days.

(21) Appl. No.: 15/580,073

(22) PCT Filed: Jun. 7, 2016

(86) PCT No.: PCT/US2016/036182
§ 371 (c)(1),
(2) Date: Dec. 6, 2017

(87) PCT Pub. No.: WO2016/200788
PCT Pub. Date: Dec. 15, 2016

(65) Prior Publication Data
US 2018/0297882 A1    Oct. 18, 2018

Related U.S. Application Data

(60) Provisional application No. 62/173,475, filed on Jun. 10, 2015.

(51) Int. Cl.
C03B 17/06    (2006.01)
C03B 7/07    (2006.01)
(Continued)

(52) U.S. Cl.
CPC .................. C03B 7/07 (2013.01); C03B 5/04 (2013.01); C03B 5/43 (2013.01); C03B 5/44 (2013.01); C03B 17/064 (2013.01); C03B 5/16 (2013.01)

(58) Field of Classification Search
CPC .... C03B 7/07; C03B 5/04; C03B 5/16; C03B 5/42; C03B 5/43; C03B 5/44; C03B 7/02; C03B 17/064
See application file for complete search history.

(56) References Cited

U.S. PATENT DOCUMENTS 4,344,785 A * 8/1982 Jensen .................... C03B 37/08
                                                        65/346
4,351,664 A    9/1982 Bansal
(Continued)

FOREIGN PATENT DOCUMENTS

CN    201686608    * 12/2010    ............... C03B 7/02
CN    201686608 U    12/2010
(Continued)

OTHER PUBLICATIONS https://www.carbolite-gero.com/products/tube-furnace-range/accessories-configurations/work-tube-accessories/Product and Accessory Video, Published: May 11, 2015 (Year: 2015).*
(Continued)

Primary Examiner — Erin Snelting
Assistant Examiner — Andrés E. Behrens, Jr.
(74) Attorney, Agent, or Firm — Kevin M. Able

(57) ABSTRACT

Disclosed is an apparatus for conditioning molten glass. The apparatus includes a connecting tube assembly having a conduit for conveying the molten glass, the conduit (108) including at least two flanges (112, 114) and a sealing member (118) disposed between the at least two flanges (112, 114) around an outer peripheral region of the flanges, thereby forming an enclosed volume between an outer wall (110) of the conduit, the at least two flanges (112, 114) and the sealing member (118). An atmosphere within the volume may be controlled such that a predetermined partial pressure of hydrogen or a predetermined partial pressure of oxygen may be maintained within the volume. A current may be (Continued)

established between the at least two flanges to heat the conduit.

18 Claims, 8 Drawing Sheets

(51) Int. Cl.
    *C03B 5/04*      (2006.01)
    *C03B 5/43*      (2006.01)
    *C03B 5/44*      (2006.01)
    *C03B 5/16*      (2006.01)

(56) References Cited

U.S. PATENT DOCUMENTS

| | | |
|---|---|---|
| 4,352,687 A | 10/1982 | Boettner |
| 4,365,987 A | 12/1982 | Boettner |
| 4,726,831 A | 2/1988 | Fogle et al. |
| 7,454,925 B2 | 11/2008 | Deangelis et al. |
| 7,628,039 B2 | 12/2009 | Deangelis et al. |
| 8,007,913 B2 | 8/2011 | Coppola et al. |
| 8,695,378 B2* | 4/2014 | Thomas ............ C03B 5/031 65/134.1 |
| 2009/0217709 A1* | 9/2009 | Adelsberg ............ C03B 5/027 65/355 |
| 2012/0125050 A1 | 5/2012 | Murakami |

FOREIGN PATENT DOCUMENTS

| | | |
|---|---|---|
| CN | 102898016 A | 1/2013 |
| DE | 3113505 A1 | 1/1983 |
| EP | 2363381 A1 | 9/2011 |
| JP | 2015105204 A | 6/2015 |
| WO | 2006115997 A2 | 11/2006 |

OTHER PUBLICATIONS

CN-201686608 (Wentai) Dec. 2010 (online machine translation), [Retrieved on Jul. 29, 2019]. Retrieved from: Espacenet (Year: 2010).*

International Search Report and Written Opinion of the International Searching Authority; PCT/US2016/036182 dated Dec. 19, 2016; 25 Pages; European Patent Office.

* cited by examiner

APPARATUS AND METHOD FOR CONDITIONING MOLTEN GLASS

This application claims the benefit of priority under 35 U.S.C. § 371 of International Application No. PCT/US16/36182, filed on Jun. 7, 2016, which claims the benefit of priority under 35 U.S.C. § 119 of U.S. Provisional Application Ser. No. 62/173,475, filed on Jun. 10, 2015, the content of which is relied upon and incorporated herein by reference in its entirety.

BACKGROUND

Field

The present disclosure is generally directed to an apparatus for processing molten glass, and more particularly, an apparatus for delivering molten glass from a refractory vessel, for example a refractory furnace, to a delivery conduit.

Technical Background

The manufacture of glass on a commercial scale is typically carried out within a melting furnace in which raw materials (batch) are added to the melting furnace and heated to a temperature at which the batch undergoes chemical reactions to produce the molten glass. Several methods of heating the batch can be used, including gas-fired burners, an electric current, or both. In a so-called hybrid process, a gas flame from one or more gas-fired combustion burners initially heats the batch. As the temperature of the batch increases and the molten glass is formed, the electrical resistance of the material decreases such that an electric current can be introduced into the molten glass through electrodes mounted in the side walls and/or floor of the melting furnace. The electric current heats the molten glass from within, and the gas burners heat the molten glass from above. In some embodiments, submerged combustion can be employed.

Subsequent downstream processing of the molten glass, for example fining and homogenizing, can be carried out in certain portions of the furnace structure or in other vessels located downstream from the melting furnace and connected to the melting furnace by conduits. To maintain an appropriate temperature of the molten glass as the molten glass is being conveyed, the molten glass may be heated. In some processes, such as the fining process, the molten glass can be heated in a fining vessel to a temperature greater than the furnace temperature to facilitate a more complete removal of bubbles from the molten glass. In other portions of the manufacturing apparatus downstream of the melting furnace the molten glass may be cooled while flowing through one or more conduits to bring the molten glass to an appropriate viscosity for forming. However, the cooling may be limited by the controlled addition of heat energy to prevent too rapid a cooling rate.

For molten glass being conveyed through a metallic conduit, an electric current can be supplied to the metallic conduit, wherein electrical resistance within the conduit causes the conduit, and the molten glass therein, to be heated. However, metallic conduits, for example platinum-containing conduits, are known to be susceptible to the formation of oxygen bubbles on the glass side of the conduit due to a phenomena known as hydrogen permeation, wherein water or hydroxyl ions break down and the hydrogen produced therefrom passes through the wall of the conduit leaving behind oxygen in the molten glass that may subsequently form bubbles in the molten glass.

SUMMARY

Molten glass exiting such refractory structures as a refractory melting furnace may require continued conditioning as the molten glass is transported through various additional vessels and conduits of a glass manufacturing apparatus.

In some embodiments, the molten glass may be refined ("fined") to remove bubbles introduced during the melting process. The molten glass may also be mixed (e.g. stirred) to disperse and eliminate inhomogeneities in the molten glass. In addition, the temperature and viscosity of the molten glass must also be carefully controlled to ensure the molten glass can be properly formed into a final glass article.

Conditioning and transportation of optical quality glass, such as the manufacture of glass sheets used to make display panels, is typically performed within a combination of refractory (e.g., refractory ceramic) and metallic vessels, and in the instance of metallic vessels, the metallic vessels may be comprised of one or more platinum group metals or other high temperature, low corrosion metals.

One phenomenon known to affect the transport of molten glass through metallic vessels is referred to as hydrogen permeation. Hydrogen permeation occurs when water, either molecular water or hydroxyl ions, breaks down into constituent hydrogen and oxygen. If the partial pressure of hydrogen within the molten glass flowing through the vessel is greater than the partial pressure of hydrogen on the outside of the vessel, the hydrogen can permeate through the metal wall of the vessel, leaving bubbles of oxygen within the molten glass. These bubbles can become entrained within the flow of molten glass, and if not removed, can find their way into the finished glass article. Additional conditioning of the molten glass may be required to minimize or prevent hydrogen permeation.

Accordingly, an apparatus for conditioning molten glass is described comprising a metallic conduit extending through a wall of a refractory vessel, a first flange joined to the conduit, a second flange joined to the conduit and spaced apart from the first flange such that the first flange is positioned between the second flange and the vessel. The apparatus may further comprise a first refractory insulating material positioned between the first flange and the second flange, a sealing member positioned around an outer perimeter of the first refractory insulating material and sealed to the first and second flanges along opposing edges of the sealing member and a gas delivery tube extending through the sealing member, the gas delivery tube configured to supply a gas to the first refractory insulating material. The sealing member may, for example, comprise a metal band. The metal band can be joined to each of the first or second flanges, such as by welding. The metal band in some embodiments comprises platinum, for example a platinum rhodium alloy.

Additionally, any one or both of the first and second flanges may comprise platinum.

In some embodiments the second flange may comprise a cooling tube extending around a perimeter thereof, the cooling tube comprising a passage configured to receive a flow of cooling fluid therethrough. In some embodiments a fibrous material may be positioned between the sealing member and the first refractory insulating material.

In certain embodiments the refractory vessel is a melting furnace. In certain other embodiments the refractory vessel can be a secondary melting furnace with a temperature lower than the primary melting furnace. In yet other embodiments the refractory vessel can be a fining vessel. The refractory vessel or vessels may be formed from a refractory ceramic material, for example refractory ceramic bricks.

In another embodiment, an apparatus for conditioning molten glass is disclosed comprising a refractory vessel, a metallic conduit extending through a wall of the refractory vessel, the conduit comprising an outer wall and an inner wall, the inner wall joined to the outer wall at a first end of the conduit positioned within the refractory vessel, and where the inner wall is spaced apart from the outer wall at an opposite end of the outer wall. The apparatus may further comprise a first flange coupled to the outer wall of the conduit and positioned adjacent the refractory vessel, a second flange coupled to the outer wall of the conduit and spaced apart from the first flange, the first flange positioned between the second flange and the vessel, a first refractory insulating material positioned between the first flange and the second flange, a third flange coupled to the inner wall of the conduit and spaced apart from the second flange, and where the second flange is positioned between the first flange and the third flange, a second refractory insulating material positioned between the second flange and the third flange. The apparatus may further comprise a third refractory insulating material positioned between the inner wall of the conduit and the outer wall of the conduit and a sealing member disposed around and spaced apart from the second refractory insulating material between the second flange and the third flange such that a gap is formed between an outer periphery of the second refractory insulating material and the sealing member.

The apparatus may still further comprise a fibrous insulating material positioned between the sealing member and the second flange and the third flange. The sealing member may include a gas supply tube extending there through, the gas supply tube configured to supply a gas to the gap.

The apparatus may further comprise a first cooling member coupled to the third flange and configured to receive a flow of cooling fluid through a passage of the cooling member.

The apparatus may additionally comprise a second cooling member coupled to the second flange and configured to receive a flow of cooling fluid through a passage of the cooling member.

In some embodiments the second flange is in electrical communication with an electrical power supply. The third flange may be in electrical communication with an electrical power supply.

The second flange can comprise a plurality of rings, wherein an inner ring is attached to the outer wall of the conduit and an outer ring is disposed around the inner ring. The inner ring may, for example, comprise platinum. The outer ring may comprise a metal that does not include platinum. For example, the outer ring may comprise nickel.

In still another embodiment, an apparatus for making glass comprising forming molten glass in a first vessel, flowing the molten glass to a second vessel through a metallic conduit, the conduit comprising a first flange coupled to the outer wall of the conduit and positioned adjacent the refractory vessel, a second flange coupled to the outer wall of the conduit and spaced apart from the first flange, the first flange positioned between the second flange and the vessel, a first refractory insulating material positioned between the first flange and the second flange, a third flange coupled to the inner wall of the conduit and spaced apart from the second flange, the second flange positioned between the first flange and the third flange, a second refractory insulating material positioned between the second flange and the third flange, a third refractory insulating material positioned between the inner wall of the conduit and the outer wall of the conduit and a sealing member disposed around and spaced apart from the second refractory insulating material between the second flange and the third flange such that a gap is formed between an outer periphery of the second refractory insulating material and the sealing member.

The method may further include heating the metallic conduit by supplying an electric current between the second and third flanges and cooling molten glass between the third flange and the second vessel to form a glass seal between the second flange and the second vessel. The second vessel may be a transport conduit. Additional features and advantages described herein will be set forth in the detailed description which follows, and in part will be readily apparent to those skilled in the art from that description or recognized by practicing the embodiments described herein, including the detailed description which follows, the claims, as well as the appended drawings.

In still another aspect, a method of making glass comprising forming molten glass in a first vessel, flowing the molten glass to a second vessel through a metallic conduit, the conduit comprising a first flange coupled to the outer wall of the conduit and positioned adjacent the refractory vessel, a second flange coupled to the outer wall of the conduit and spaced apart from the first flange, the first flange positioned between the second flange and the vessel, a first refractory insulating material positioned between the first flange and the second flange, a third flange coupled to the inner wall of the conduit and spaced apart from the second flange, the second flange positioned between the first flange and the third flange, a second refractory insulating material positioned between the second flange and the third flange, a third refractory insulating material positioned between the inner wall of the conduit and the outer wall of the conduit and a sealing member disposed around and spaced apart from the second refractory insulating material between the second flange and the third flange such that a gap is formed between an outer periphery of the second refractory insulating material and the sealing member.

The method may further include heating the metallic conduit by supplying an electric current between the second and third flanges and cooling molten glass between the third flange and the second vessel to form a glass seal between the second flange and the second vessel. The second vessel may be a transport conduit.

The method may further comprise forming the molten glass into a glass article, for example a glass ribbon. The glass ribbon may be separated into individual glass sheets. In further embodiments, the glass ribbon may be wound onto a spool.

Additional features and advantages described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter. Unless otherwise indicated, drawings are not to scale.

DETAILED DESCRIPTION

Figure 1:
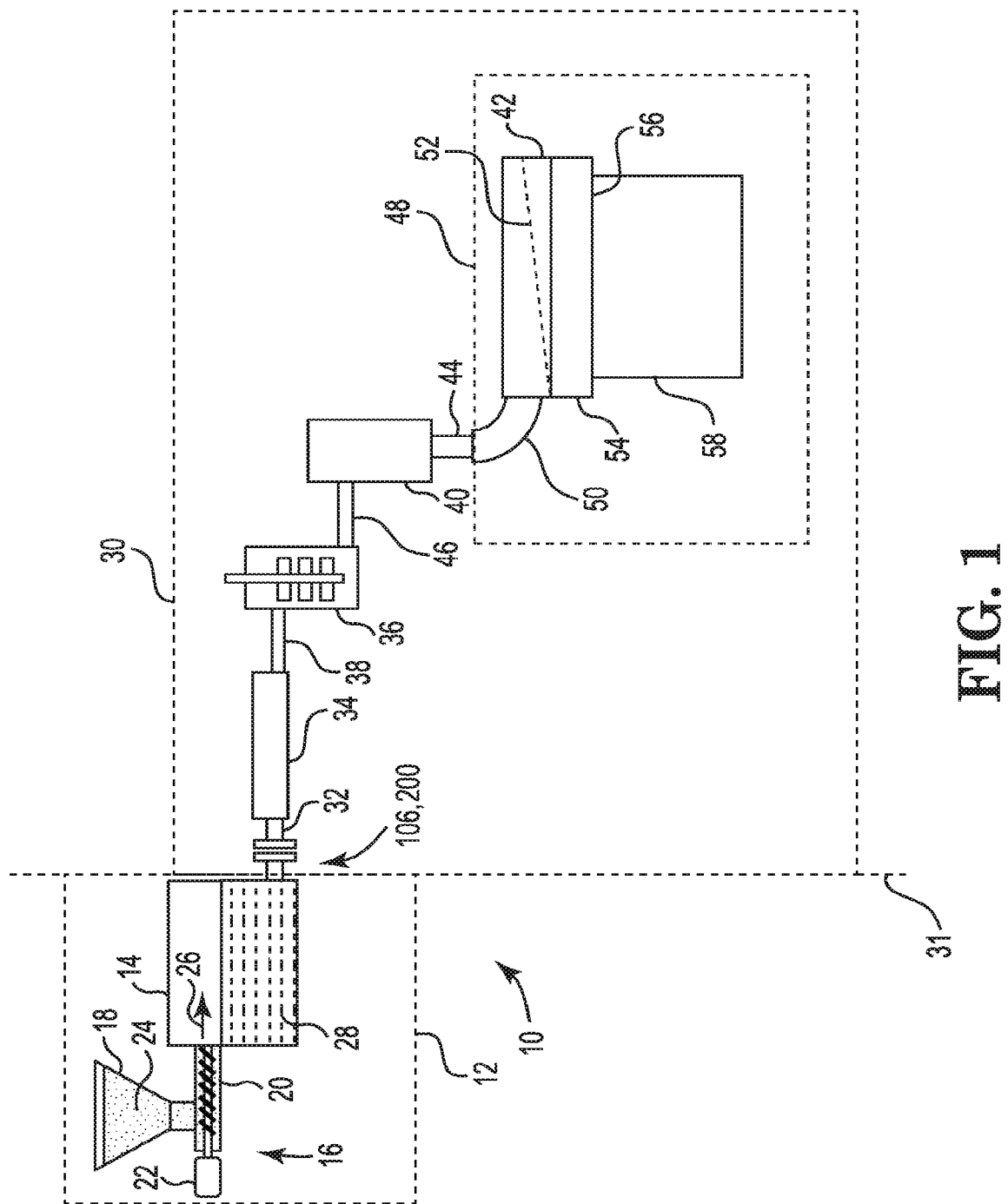
FIG. 1 is schematic view of an example glass making process in accordance with an embodiment of the present disclosure.

Apparatus and methods will now be described more fully hereinafter with reference to the accompanying drawings in which example embodiments of the disclosure are shown. Whenever possible, the same reference numerals are used throughout the drawings to refer to the same or like parts. However, this disclosure may be embodied in many different forms and should not be construed as limited to the embodiments set forth herein.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus, specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

Shown in FIG. 1 is an example glass manufacturing apparatus 10. In some examples, the glass manufacturing apparatus 10 can comprise a glass melting furnace 12 that can include a melting vessel 14. In addition to melting vessel 14, glass melting furnace 12 can optionally include one or more additional components such as heating elements (e.g., combustion burners or electrodes) that heat the batch and convert the batch into molten glass. In further examples, glass melting furnace 12 may include thermal management devices (e.g., insulation components) arranged to reduce heat lost from a vicinity of the melting vessel. In still further examples, glass melting furnace 12 may include electronic devices and/or electromechanical devices configured to facilitate melting of the batch material into a glass melt. Still further, glass melting furnace 12 may include support structures (e.g., support chassis, support member, etc.) or other components.

Glass melting vessel 14 is typically comprised of refractory material, such as a refractory ceramic material. In some examples glass melting vessel 14 may be constructed from refractory ceramic bricks, for example refractory ceramic bricks comprising alumina or zirconia.

In some examples, the glass melting furnace may be incorporated as a component of a glass manufacturing apparatus configured to fabricate a glass substrate, for example a glass ribbon of a continuous length. In some examples, the glass melting furnace of the disclosure may be incorporated as a component of a glass manufacturing apparatus comprising a slot draw apparatus, a float bath apparatus, a down-draw apparatus, an up-draw apparatus (e.g., including a fusion process), a press-rolling apparatus, a tube drawing apparatus or any other glass manufacturing apparatus that would benefit from the present disclosure. By way of example, FIG. 1 schematically illustrates glass melting furnace 12 as a component of a fusion down-draw glass manufacturing apparatus 10 for fusion drawing a glass ribbon, e.g., for subsequent processing into individual glass sheets.

The glass manufacturing apparatus 10 (e.g., fusion down-draw apparatus 10) can optionally include an upstream glass manufacturing apparatus 16 positioned upstream of glass melting vessel 14. In some examples, a portion of, or the entire upstream glass manufacturing apparatus 16, may be incorporated as part of the glass melting furnace 12.

As shown in the illustrated example, the upstream glass manufacturing apparatus 16 can include a batch storage bin 18, a batch delivery device 20 and a motor 22 connected to the batch delivery device. Storage bin 18 may be configured to store a quantity of batch 24 that can be fed into melting vessel 14 of glass melting furnace 12, as indicated by arrow 26. Batch 24 typically comprises one or more glass forming metal oxides and one or more modifying agents. In some examples, batch delivery device 20 can be powered by motor 22 configured to deliver a predetermined amount of batch 24 from the storage bin 18 to melting vessel 14. In further examples, motor 22 can power batch delivery device 20 to introduce batch 24 at a controlled rate based on a level of molten glass sensed downstream from melting vessel 14. Batch 24 within melting vessel 14 can thereafter be heated to form molten glass 28.

Glass manufacturing apparatus 10 can also optionally include a downstream glass manufacturing apparatus 30 that is positioned downstream relative to the glass melting furnace 12. In some examples, a portion of the downstream glass manufacturing apparatus 30 may be incorporated as part of glass melting furnace 12. In the embodiment illustrated in FIG. 1, dashed line 31 divides melting furnace 12 (and upstream manufacturing apparatus 16) from downstream manufacturing apparatus 30. However, in some instances, first connecting conduit 32 discussed below, or other portions of the downstream glass manufacturing apparatus 30, may be incorporated as part of the glass melting furnace 12. Elements of the downstream glass manufacturing apparatus, including first connecting conduit 32, may be formed from a precious metal. Suitable precious metals include platinum group metals selected from the group of metals consisting of platinum, iridium, rhodium, osmium, ruthenium and palladium, or alloys thereof. For example, downstream components of the glass manufacturing apparatus may be formed from a platinum-rhodium alloy including from about 70 to about 90% by weight platinum and about 10% to about 30% by weight rhodium. However, other suitable metals can include molybdenum, palladium, rhenium, tantalum, titanium, tungsten and alloys thereof.

The downstream glass manufacturing apparatus 30 can include a first conditioning (i.e. processing) vessel such as fining vessel 34, located downstream from melting vessel 14 and coupled to melting vessel 14 by way of the above-referenced first connecting conduit 32. In some examples, molten glass 28 may be gravity fed from melting vessel 14 to fining vessel 34 by way of first connecting conduit 32. For instance, gravity may cause molten glass 28 to pass through an interior pathway of first connecting conduit 32 from melting vessel 14 to fining vessel 34. It should be understood, however, that other conditioning vessels may be positioned downstream of melting vessel 14, for example between melting vessel 14 and fining vessel 34. In some embodiments, a conditioning vessel (not shown), for example a cooling vessel, may be employed between the melting vessel and the fining vessel wherein molten glass received from the melting vessel is cooled to a temperature lower than the temperature of the molten glass in the melting vessel before entering the fining vessel.

Within fining vessel 34, bubbles may be removed from molten glass 28 by various techniques. For example, batch 24 may include multivalent compounds (i.e. fining agents) such as tin oxide that, when heated, undergo a chemical reduction reaction and release oxygen. Other suitable fining agents include without limitation arsenic, antimony, iron and cerium. Fining vessel 34 is heated to a temperature greater than the melting vessel temperature, thereby heating the fining agent. Oxygen bubbles produced by the temperature-induced chemical reduction of the fining agent(s) rise through the molten glass within the fining vessel, wherein gases in the melt produced in the melting furnace can coalesce into the oxygen bubbles produced by the fining agent. The enlarged gas bubbles can then rise to a free surface of the molten glass in the fining vessel and thereafter be vented out.

The downstream glass manufacturing apparatus 30 can further include another conditioning vessel such as a mixing vessel 36 for mixing the molten glass that may be located downstream from the fining vessel 34. Mixing vessel 36 can be used to provide a homogenous glass melt composition, thereby reducing or eliminating physical and/or thermal inhomogeneities that may otherwise exist within the fined molten glass exiting the fining vessel. As shown, fining vessel 34 may be coupled to molten glass mixing vessel 36 by way of a second connecting conduit 38. In some examples, molten glass 28 may be gravity fed from the fining vessel 34 to mixing vessel 36 by way of second connecting conduit 38. For instance, gravity may cause molten glass 28 to pass through an interior pathway of second connecting conduit 38 from fining vessel 34 to mixing vessel 36. It should be noted that while mixing vessel 36 is shown downstream of fining vessel 34, mixing vessel 36 may be positioned upstream from fining vessel 34. In some embodiments, downstream glass manufacturing apparatus 30 may include multiple mixing vessels, for example a mixing vessel upstream from fining vessel 34 and a mixing vessel downstream from fining vessel 34. These multiple mixing vessels may be of the same design, or they may be of a different design from one another.

Downstream glass manufacturing apparatus 30 can further include another conditioning vessel such as delivery vessel 40 that may be located downstream from mixing vessel 36. Delivery vessel 40 may condition molten glass 28 to be fed into a downstream forming device. For instance, delivery vessel 40 can act as an accumulator and/or flow controller to adjust and provide a consistent flow of molten glass 28 to forming body 42 by way of exit conduit 44. As shown, mixing vessel 36 may be coupled to delivery vessel 40 by way of third connecting conduit 46. In some examples, molten glass 28 may be gravity fed from mixing vessel 36 to delivery vessel 40 by way of third connecting conduit 46. For instance, gravity may drive molten glass 28 through an interior pathway of third connecting conduit 46 from mixing vessel 36 to delivery vessel 40.

Downstream glass manufacturing apparatus 30 can further include forming apparatus 48 comprising the above-referenced forming body 42 including inlet conduit 50. Exit conduit 44 can be positioned to deliver molten glass 28 from delivery vessel 40 to inlet conduit 50 of forming apparatus 48. In a fusion forming process, forming body 42 can comprise a trough 52 positioned in an upper surface of the forming body and converging forming surfaces 54 that converge along a bottom edge (root) 56 of the forming body. Molten glass delivered to the forming body trough via delivery vessel 40, exit conduit 44 and inlet conduit 50 overflows the walls of the trough and descends along the converging forming surfaces 54 as separate flows of molten glass. The separate flows of molten glass join below and along the root to produce a single ribbon of glass 58 that is drawn from root 56 by applying tension to the glass ribbon, such as by a combination of gravity and pulling rolls (not shown), to control the dimensions of the glass ribbon as the glass cools. As viscosity increases, the glass ribbon 58 goes through a visco-elastic transition and acquires mechanical properties that give the glass ribbon 58 stable dimensional characteristics. When the glass ribbon reaches and elastic state, the glass ribbon may subsequently be separated into individual glass sheets by a glass separation apparatus (not shown). In further embodiments, the glass ribbon may instead be spooled onto rolls, and in some examples the rolls may be stored for later use.

In some embodiments, (not shown), forming apparatus 48 may comprise multiple forming bodies, for example wherein a upper forming body produces one or more flow of molten glass that intersect with the molten glass contained within the trough of a lower forming body. Such combinations of forming bodies may be used, for example, to produce laminated glass ribbons, wherein glass flows from the upper forming body form an outer layer on the flow of molten glass from the lower forming body. A suitable forming apparatus is described, for example, in U.S. Pat. No. 8,007,913 to Coppola et al., the content of which is incorporated herein in its entirety by reference.

Figure 2:
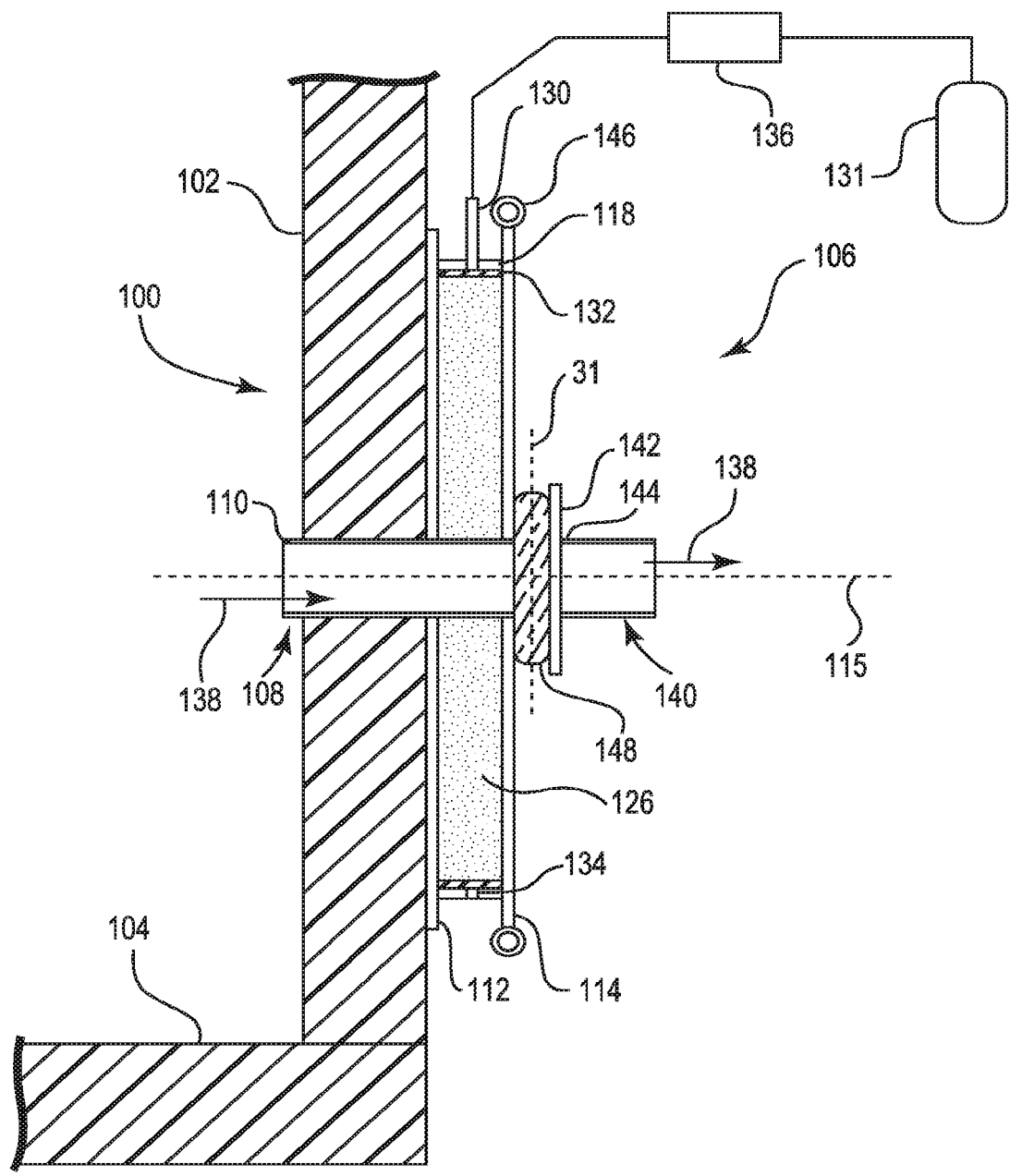
FIG. 2 is a schematic cross sectional view of a connecting tube assembly according to an embodiment of the present disclosure.

FIG. 2 depicts a portion of an exemplary refractory vessel 100, for example a refractory ceramic vessel, that may comprise a glass manufacturing apparatus such as but not limited to the example fusion glass manufacturing apparatus illustrated in FIG. 1. For example, refractory vessel 100 may be a melting vessel such as melting vessel 14. Refractory vessel 100 includes a side wall 102 and a bottom wall 104. Side wall 102 and bottom wall 104 may in some examples be formed from ceramic bricks. FIG. 2 further shows a connecting tube assembly 106 comprising a conduit 108 including an outer wall 110 defining a passage that receives a flow of molten glass from refractory vessel 100, conduit 108 extending through a passage of the refractory vessel side wall 102. In other embodiments, conduit 108 may extend through a similar passage of bottom wall 104. Conduit 108 may be, for example, a cylindrical conduit wherein outer wall 110 includes a circular cross sectional shape in a plane perpendicular to longitudinal axis 115 of the conduit. However, in various other embodiments, conduit 108 may have a non-circular cross sectional shape, for example an oblong cross sectional shape (e.g., a rectangular cross sectional shape, an oval cross sectional shape, an elliptical cross sectional shape, or a combination of any of these or other shapes). Conduit 108 may be formed from a high temperature metal capable of withstanding the high temperature and corrosive nature of molten glass. For example, conduit 108 may be formed from one or more platinum group metals selected from the group consisting of platinum, rhodium, iridium, palladium, osmium, ruthenium and alloys thereof. In certain embodiments, conduit 108 may be formed from a platinum-rhodium alloy. In specific examples the platinum-rhodium alloy may comprise platinum in an amount ranging from about 70% to about 90% by weight, and may further comprise rhodium in an amount ranging from about 10% to about 30% by weight, for example a 80%-20% platinum-rhodium alloy.

Connecting tube assembly 106 further comprises a first flange 112 joined to outer wall 110 of conduit 108 and a second flange 114 also joined to outer wall 110 of conduit 108 and spaced apart from first flange 112, wherein first flange 112 is positioned between vessel side wall 102 (or alternatively bottom wall 104) and second flange 114. First and second flanges 112, 114 may be joined to conduit 108 by welding or another suitable joining technique. In various embodiments, each of first and second flanges 112, 114 may be a flat disc comprising an opening through which conduit 108 extends, wherein a plane of each flange is perpendicular to a longitudinal axis 115 of conduit 108. Accordingly, first and/or second flanges 112, 114 may be formed generally as a ring extending around and joined to outer wall 110. First and second flanges 112, 114 may be formed, for example, from a high temperature metal, e.g., one or more platinum group metals selected from the group consisting of platinum, rhodium, iridium, palladium, osmium, ruthenium and alloys thereof. First and second flanges 112, 114 may be formed from an oxide dispersed reinforced alloy. In certain embodiments first and second flanges 112, 114 may be formed from a platinum-rhodium alloy. In specific examples the platinum-rhodium alloy may comprise platinum in an amount ranging from about 70% to about 90% by weight, and may further comprise rhodium in an amount ranging from about 10% to about 30% by weight, for example a 80%-20% platinum-rhodium alloy.

Figure 3:
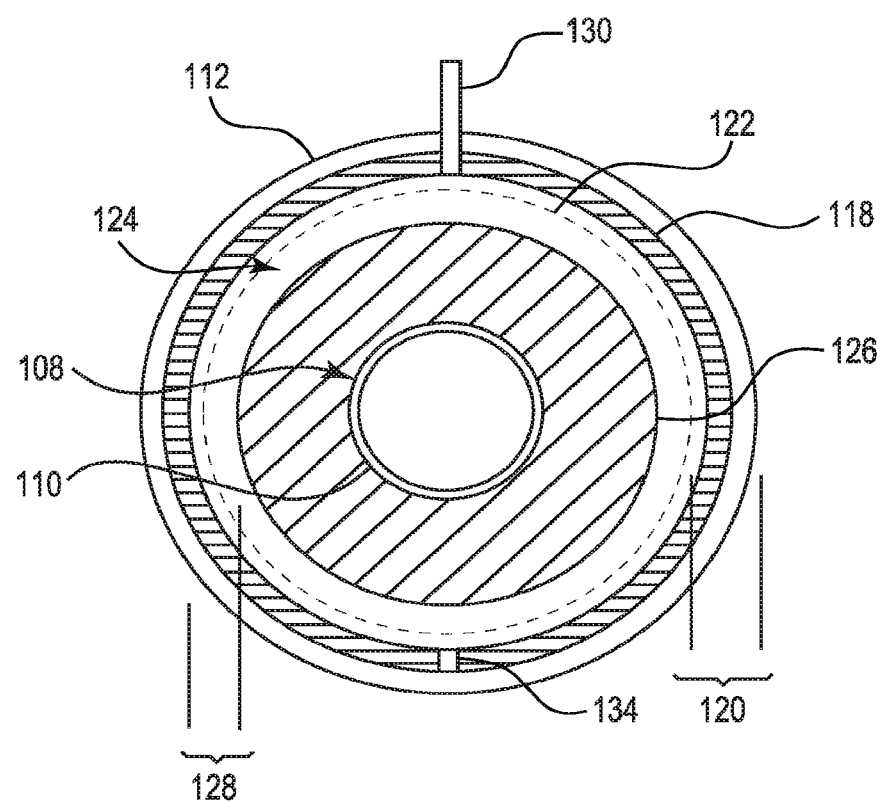
FIG. 3 is a cross sectional side view of a portion of the connecting tube assembly of FIG. 2, wherein a second flange has been omitted to show the interior of the connecting tube assembly.

As best seen in FIG. 3, connecting tube assembly 106 may further comprise a sealing member 118 joined to an outer region 120 of first and second flanges 112, 114, outer region 120 extending from dashed line 122 (shown on first flange 112) to the outermost edge of each flange. It should be noted that second flange 114 is not shown in FIG. 3, as FIG. 3 shows a cross section between first and second flanges 112 and 114. Sealing member 118 forms an enclosed volume 124 between the first and second flanges 112, 114, outer wall 110 and sealing member 118. Sealing member 118 may be, for example, a metal band, wherein the edges of the metal band are joined, for example by welding or other suitable joining method, to first and second flanges 112, 114 within outer region 120 of the first and second flanges. Sealing member 118 may be formed, for example, from a high temperature metal, e.g., one or more platinum group metals selected from the group consisting of platinum, rhodium, iridium, palladium, osmium, ruthenium and alloys thereof. In certain embodiments, sealing member 118 may be formed from a platinum-rhodium alloy. In specific examples the platinum-rhodium alloy may comprise platinum in an amount ranging from about 70% to about 90% by weight, and may further comprise rhodium in an amount ranging from about 10% to about 30% by weight, for example a 80%-20% platinum-rhodium alloy.

In further examples, connecting tube assembly 106 may include a refractory insulating material 126 positioned between first flange 112 and second flange 114 and within enclosed volume 124 formed by sealing member 118. Refractory insulating material 126 may be, for example, an annular body that extends around conduit outer wall 110. A suitable refractory insulating material 126 may be, for example, a high alumina content material such as TAMAX®, available from HarbisonWalker International. In certain examples, refractory insulating material 126 may comprise a plurality of annular refractory bodies, such as a stacked arrangement of refractory sheets. In other examples, refractory insulating material 126 may comprise a plurality of blocks positioned about outer wall 110 between first and second flanges 112, 114. In example embodiments, refractory insulating material 126 is spaced apart from sealing member 118 such that a gap 128 (see FIG. 3) exists between first refractory insulating material 126 and sealing member 118.

A gas delivery tube 130 extends through sealing member 118 and is configured to supply a gas from gas supply 131 to enclosed volume 124 formed by sealing member 118 between first flange 112 and second flange 114. In various examples, gas delivery tube 130 is configured to supply a gas to enclosed volume 124, for example gap 128, between sealing member 118 and refractory insulating material 126. In some embodiments, a fibrous material 132, for example a refractory fiber tape (see FIG. 2), may be included within gap 128, and may in certain embodiments completely fill the gap. A suitable fibrous refractory tape may be an aluminosilicate fibrous material such as Fiberfrax 970-J manufactured by Unifrax LLC. The fibrous material 132 is selected to have a porosity such that the gas supplied by gas delivery tube 130 is flowable about the perimeter of refractory insulating material 126. Additionally, the porosity of refractory insulating material 126 is such that the gas can permeate the refractory insulating material and come in contact with the outside wall of conduit 108. The gas supplied to the connecting tube assembly may be used to control a partial pressure of hydrogen ($pH_2$), and/or a partial pressure of oxygen ($pO_2$) within enclosed volume 124 between sealing member 118 and the first and second flanges, 112, 114. This may be achieved, for example, by controlling a humidity of the supplied gas, e.g., a dew point. A vent 134 may be provided in sealing member 118 to allow the gas to escape from volume 124, but sufficiently small that a positive pressure relative to an external ambient pressure is maintained within the volume. Vent 134 may, in some embodiments, be located opposite the gas delivery tube 130.

In some embodiments, a control system may be used to control the level of hydrogen around the exterior (non-glass contact surface) of conduit 108 so as to suppress the formation of gaseous inclusions and surface blisters in glass sheets produced by glass manufacturing apparatus 10. In addition, the control system can be used to maintain an atmosphere with minimal oxygen around the vessel(s) so as to reduce the oxidation of precious metals comprising the conduit.

To suppress the formation of inclusions in molten glass 28, the level of hydrogen on the exterior surface of conduit 108 needs to be equal to or greater than the level of hydrogen on the inside surfaces of conduit 108 (that is, the surfaces of conduit 108 that are in direct contact with the molten glass). The hydrogen level on the exterior surfaces of conduit 108 is determined by the thermodynamic equilibrium of the water decomposition reaction $H_2O \rightarrow H_2 + \frac{1}{2}O_2$. In accordance with thermodynamic tables, the free energy ($\Delta G$) for the water decomposition reaction is equal to 58,900-13.1T, where T is the temperature in degrees Kelvin and G is the free energy in calories per mole. At a given temperature, the equilibrium constant for the water reaction can be calculated by using the relationship $K_{eq} = e^{-G/RT}$, where G and T are as previously noted, and R is the universal gas constant. Once $K_{eq}$ is known, the ratio of the partial pressures of the various gases involved in the water breakdown can be calculated, where $K_{eq} = [(pH_2)(pO_2)^{1/2}]/pH_2O$. For example, at 1450° C., $K_{eq}$ is equal to $2.47 \times 10^{-5}$. Thus, if a 75° F. dew point air environment ($pH_2O$ of 0.030 atmospheres) is heated to 1450° C., then $pH_2$ is calculated to be $1.59 \times 10^{-6}$ atmospheres (1.59 ppm). In view of this equilibrium, lowering the partial pressure of oxygen, while maintaining a constant dew point ($pH_2O$) can substantially increase the hydrogen level in the atmosphere. It should be noted that the presence of nitrogen (or other inert gas) in the preferred gas mixture does not directly participate in the water decomposition reaction. Instead, the partial pressure of the inert gas affects the partial pressure of oxygen in accordance with the ideal gas law. And, the change in partial pressure of oxygen due to water decomposition is what influences the equilibrium gases formed.

It can be seen that the hydrogen level in the atmosphere within enclosed volume 124 between the sealing member and the first and second flanges, 112, 114 should be greater than or equal to the hydrogen level calculated in the following equation that uses the equilibrium relationship:

$$pH_2(ppm) = 78,000 \times e^{-(G/RT)}, \qquad (1)$$

where G, R and T have been previously defined. This equation can re-written in numerical form as:

$$pH_2(ppm) = 78,000 \times e^{[(-58,900+13.1\,T)/(1.987*T)]}, \qquad (2)$$

where temperature is in degrees Kelvin.

In accordance with the foregoing, embodiments of the present disclosure may further include a control system 136 that controls the environment/atmosphere in contact with conduit 108 and prevents the problematical oxidation reactions from occurring at the metal/glass interface of conduit 108. In various embodiments, control system 136 may be a closed loop control system. Again, the oxidation reactions lead to the formation of gaseous inclusions in glass article produced by glass manufacturing apparatus 10. In addition, oxidation reactions with conduit 108 can lead to the failure of the conduit.

In some embodiments, control system 136 controls a gas system that has a mixture of water vapor, oxygen and nitrogen within the connecting tube assembly 106, and more specifically within volume 124 defined by outer wall 110, sealing member 118 and first and second flanges 112, 114. Typical values of oxygen can be from about 0.01% to about 1% and water from about 2% to about 20%, with the balance of the gas being nitrogen (or another inert gas like argon). The gas system can be run as high as about 21% oxygen and have a dew point as high as about 200° F. A gas system comprising 0.01% oxygen and 20% water at a 200° F. dew point can give a range of hydrogen from about 1 to about 38,000 ppm at 1700° C. Alternatively, the mixture of gases introduced into volume 124 may include hydrocarbons (and oxygen), ammonia, cracked ammonia products and/or combustion products.

Connecting tube assembly 106 may be used to convey molten glass in a flow direction 138 from refractory vessel 100 to another vessel or conduit. For example, in accordance with the embodiment depicted in FIG. 2, a second conduit 140 may be positioned adjacent conduit 108, wherein second conduit 140 includes a flange 142 positioned at an end 144 of second conduit 140 directly opposite conduit 108 and second flange 114. Second conduit 140, including flange 142, may be formed, for example, from a high temperature metal, e.g., one or more platinum group metals selected from the group consisting of platinum, rhodium, iridium, palladium, osmium, ruthenium and alloys thereof. In certain embodiments, second conduit 140 and flange 142 may be formed from a platinum-rhodium alloy. In specific examples the platinum-rhodium alloy may comprise platinum in an amount ranging from about 70% to about 90% by weight, and may further comprise rhodium in an amount ranging from about 10% to about 30% by weight, for example a 80%-20% platinum-rhodium alloy.

Connecting tube assembly 106 may optionally include at least one cooling tube 146 coupled to second flange 114. For example, cooling tube 146 may be attached around a perimeter of second flange 114. A cooling fluid may thereafter be flowed through a passage extending longitudinally through the cooling tube. The cooling fluid is typically a liquid, such as water, but in some examples the cooling fluid may be a gas, such as without limitation air, nitrogen, helium and/or argon. The cooling tube functions to cool second flange 114 and therefore molten glass that may leak between second flange 114 and flange 142 of second conduit 140, thereby forming a glass seal 148 between conduit 108 and second conduit 140. Glass seal 148 may further function to electrically isolate conduit 108 from second conduit 140. In reference to FIG. 1, connecting tube assembly 106 may form a transition extending between melting vessel 14 and connecting conduit 32. For example, in the embodiment according to FIG. 1, glass seal 148 is the demarcation between glass melting furnace 12 and downstream glass manufacturing apparatus 30, as indicated by dashed line 31 (see FIG. 2).

Figure 4:
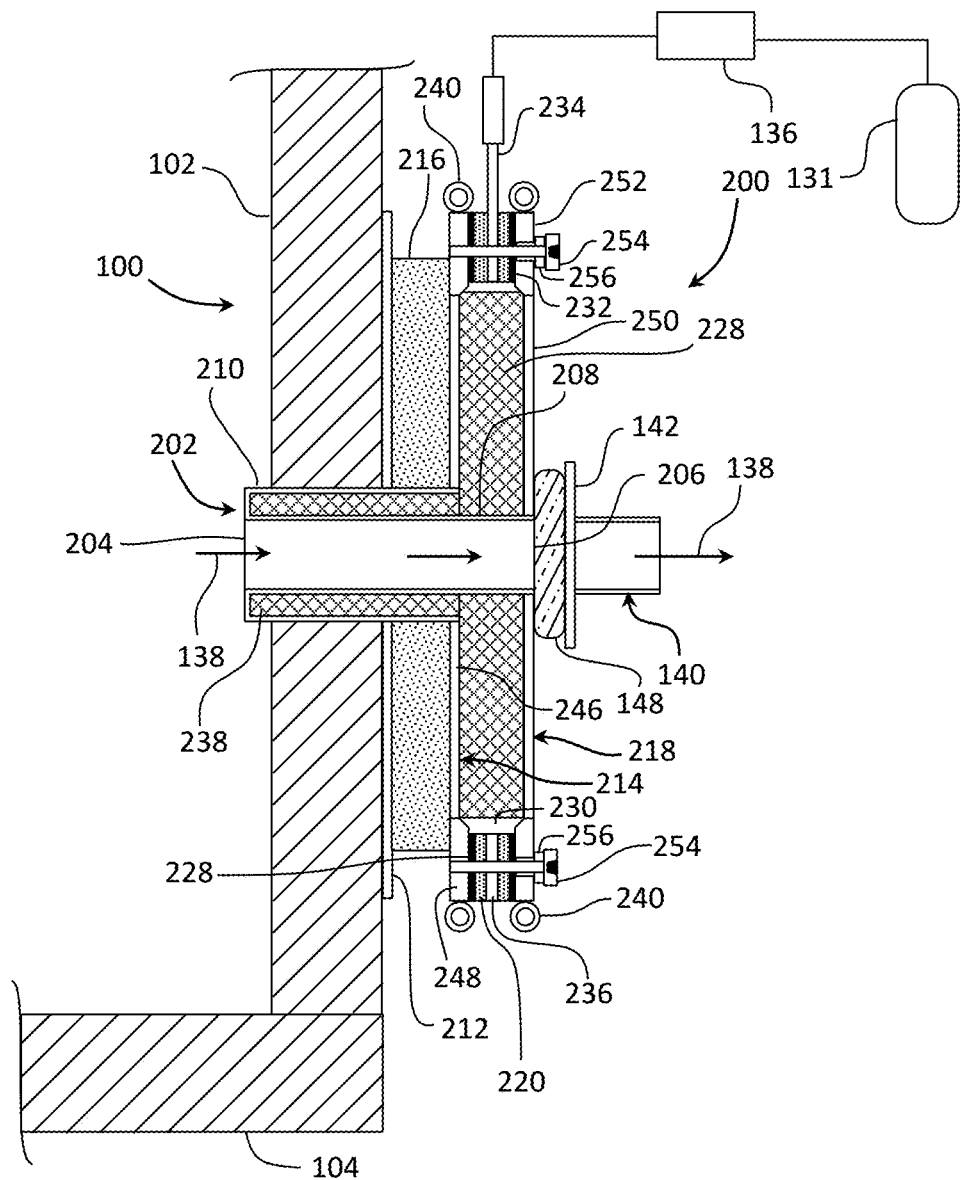
FIG. 4 is a schematic cross sectional view of a connecting tube assembly according to another embodiment of the present disclosure.

In another embodiment of the present disclosure, a connecting tube assembly 200 is illustrated in FIG. 4. Connecting tube assembly 200 comprises a conduit 202 extending between a first end 204 to a second end 206. Conduit 202 further comprises an inner wall 208 and an outer wall 210. Inner wall 208 and outer wall 210 are joined at first end 204 of conduit 202. However, inner wall 208 and outer wall 210 are spaced apart at the opposite, un-joined end of outer wall 210. Accordingly, there is a gap between inner wall 208 and outer wall 210 that extends from first end 204 to the opposite end of outer wall 210. The length of inner wall 208 is longer than the length of outer wall 210 such that inner wall 208 extends longitudinally beyond outer wall 210. Conduit 202 extends through a passage in refractory vessel side wall 102 such that first end 204 is positioned at or within a volume of refractory vessel 100 and second end 206 is positioned outside of refractory vessel 100. That is, first end 204 may in some embodiments be flush with the inside surface of side wall 102, but in other embodiments first end 204 may terminate within side wall 102, while in still other embodiments, such as the embodiment illustrated in FIG. 4, first end 204 may extend into refractory vessel 100. In other examples, conduit 202 may similarly extend through a passage in bottom wall 104.

In some embodiments, connecting tube assembly 200 further comprises a first flange 212 joined to outer wall 210 of conduit 202. First flange 212 is positioned adjacent an exterior surface of refractory vessel wall 102 (opposite molten glass 28). For example, first flange 212 may abut refractory vessel wall 102. First flange 212 comprises an opening through which conduit 202 extends, wherein a plane of first flange 212 is perpendicular to a longitudinal axis of conduit 202. Accordingly, first flange 212 extends as a ring around and is joined to outside wall 210, for example by welding or another suitable joining technique. First flange 212 may be formed, for example, from a high temperature metal, e.g., one or more platinum group metals selected from the group consisting of platinum, rhodium, iridium, palladium, osmium, ruthenium and alloys thereof. First flange 212 may be formed from an oxide dispersed reinforced alloy, for example a dispersion strengthened platinum (e.g., a zirconia strengthened platinum). In certain embodiments, first flange 212 may be formed from a platinum-rhodium alloy. In specific examples the platinum-rhodium alloy may comprise platinum in an amount ranging from about 70% to about 90% by weight, and may further comprise rhodium in an amount ranging from about 10% to about 30% by weight, for example a 80%-20% platinum-rhodium alloy.

Connecting tube assembly 200 further comprises a second flange 214 positioned adjacent but spaced apart from first flange 212 such that first flange 212 is positioned between refractory vessel wall 102 and second flange 214. Second flange 214 comprises an opening through which conduit 202 extends, wherein a plane of second flange 214 is perpendicular to a longitudinal axis of conduit 202. Accordingly, second flange 214 extends as a ring around outside wall 210 and is joined to outside wall 210, such as by welding or another suitable joining technique. Second flange 214 may be formed, for example, from a high temperature metal, e.g., one or more platinum group metals selected from the group consisting of platinum, rhodium, iridium, palladium, osmium, ruthenium and alloys thereof. Second flange 214 may be formed from an oxide dispersed reinforced alloy, for example a dispersion strengthened platinum (e.g., a zirconia strengthened platinum). In certain embodiments, flange 212 may be formed from a platinum-rhodium alloy. In specific examples the platinum-rhodium alloy may comprise platinum in an amount ranging from about 70% to about 90% by weight, and may further comprise rhodium in an amount ranging from about 10% to about 30% by weight, for example a 80%-20% platinum-rhodium alloy.

In accordance with various embodiments, connecting tube assembly 200 may further comprise a first refractory insulating material 216 positioned about conduit 202 between first and second flanges 212, 214. For example, first refractory insulating material 216 may be an annular body comprising a passage through which conduit 202 (e.g. outer wall 210) extends. However, in other embodiments, first refractory insulating material 216 may comprise a plurality of segments, for example a plurality of stacked refractory insulating discs or a plurality of fitted blocks. A suitable first refractory insulating material may be, for example, a high alumina content material such as TAMAX®, available from HarbisonWalker International.

Connecting tube assembly 200 may further comprise a third flange 218 joined to inner wall 208 and spaced apart from second flange 214 such that second flange 214 is positioned between first flange 212 and third flange 218. Third flange 218 comprises an opening through which conduit 202 extends (more specifically inside wall 208), wherein a plane of third flange 218 is perpendicular to a longitudinal axis of conduit 202. Accordingly, third flange 218 extends as a ring around inside wall 208 and is joined to inside wall 208, such as by welding. Third flange 218 may be formed, for example, from a high temperature metal, e.g., one or more platinum group metals selected from the group consisting of platinum, rhodium, iridium, palladium, osmium, ruthenium and alloys thereof. Third flange 218 may be formed from an oxide dispersed reinforced alloy, for example a dispersion strengthened platinum (e.g., a zirconia strengthened platinum known commercially as ZGS platinum). In certain embodiments, third flange 218 may be formed from a platinum-rhodium alloy. In specific examples the platinum-rhodium alloy may comprise platinum in an amount ranging from about 70% to about 90% by weight, and may further comprise rhodium in an amount ranging from about 10% to about 30% by weight, for example a 80%-20% platinum-rhodium alloy.

Figure 5:
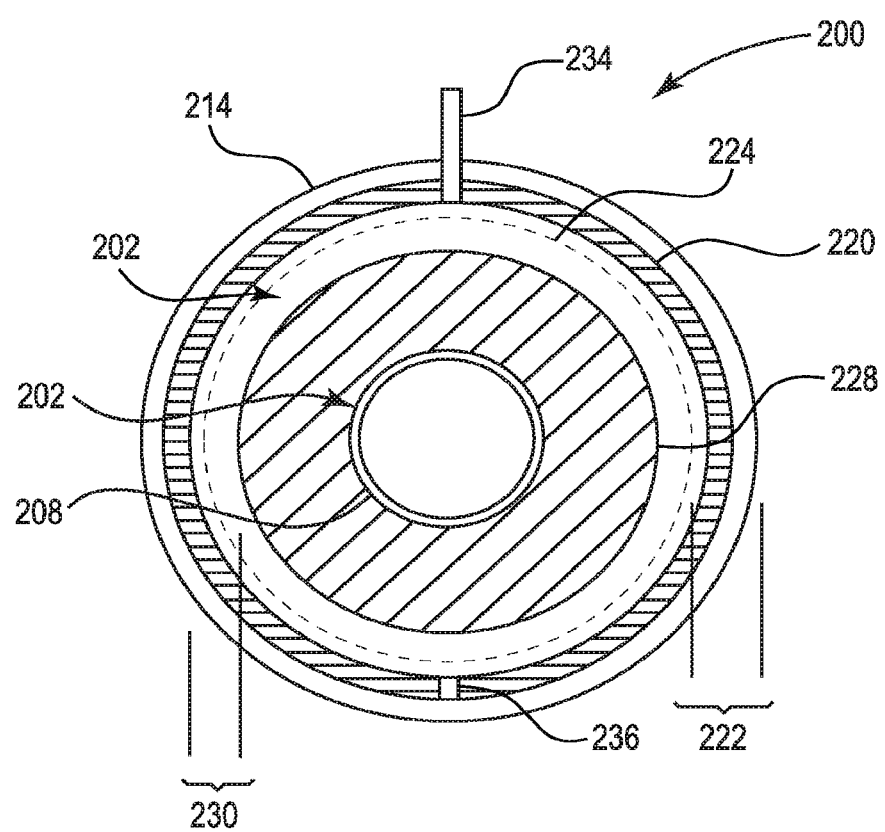
FIG. 5 is a cross sectional side view of a portion of the connecting tube assembly of FIG. 4, wherein a third flange has been omitted to show the interior of the connecting tube assembly between the second and third flanges.

Connecting tube assembly 200 may further include a sealing member 220 positioned between second flange 214 and third flange 218 at an outer region 222 of first and second flanges 112, 114, outer region 222 extending from dashed line 224 (shown on second flange 114) to the outermost edge of each flange (see FIGS. 4 and 5). Sealing member 220 forms an enclosed volume 226 between second flange 214 and third flange 218, the enclosed volume further extending radially outward from inside wall 208 to sealing member 220. A suitable material for sealing member 220 may be, for example, ZIRCAR Refractory Sheet Type RS-100 manufactured by ZIRCAR Refractory Composites, Inc.

Connecting tube assembly 200 may further include a second refractory insulating material 228 positioned within enclosed volume 226 and extending around inside wall 208, second refractory insulating material 228 being spaced apart from sealing member 220, thereby forming a gap 230 between second refractory insulating material and sealing member 220. For example, second refractory insulating material 228 may be an annular body comprising a passage through which conduit 202 (e.g. inner wall 208) extends. However, in other embodiments, second refractory insulating material 228 may comprise a plurality of segments, for example a plurality of stacked refractory insulating discs or a plurality of fitted blocks. A suitable second refractory insulating material 228 may be, for example, a high alumina content material such as TAMAX®, available from HarbisonWalker International.

Optionally, a fibrous material 232, for example a fibrous paper, may be positioned between sealing member 220 and both second and third flanges 214, 218. Fibrous material 232 may be a fibrous paper. For example, the fibrous material may be an alumino-silicate fibrous material such as Fiberfrax 970-J paper manufactured by Unifrax LLC.

Connecting tube assembly 200 may further include a gas delivery tube 234 extending through sealing member 220 to gap 230, wherein gas delivery tube 234 is in fluid communication with a gas supply (not shown), wherein a gas, as previously described, may be provided. Sealing member 220 may further comprise a vent passage 236 extending through the thickness of sealing member 220 and through which gas within enclosed volume 226 (e.g., gap 230) may be exhausted.

In some embodiments a control system may be used to control the level of hydrogen around the exterior (non-glass contact surface) of conduit 202 to suppress the formation of gaseous inclusions and surface blisters in glass sheets produced by glass manufacturing apparatus 10. In addition, the control system can be used to maintain an atmosphere with minimal oxygen around the vessel(s) so as to reduce the oxidation of precious metals comprising the conduit.

In accordance with the foregoing and previous descriptions, embodiments of the present disclosure may further include control system 136 that controls the environment/atmosphere in contact with conduit 202 and prevents problematical oxidation reactions from occurring at the metal/glass interface of conduit 202. In various embodiments, control system 136 may be a closed loop control system that controls the partial pressure of hydrogen and/or oxygen in contact with conduit 202 via the supplied gas, and in particular with inner wall 208. Again, the oxidation reactions described supra can lead to the formation of gaseous inclusions in glass article produced by glass manufacturing apparatus 10. In addition, oxidation reactions with conduit 202 can lead to the failure of the conduit.

In some embodiments, control system 136 controls a gas system that has a mixture of water vapor, oxygen and nitrogen within the connecting tube assembly 200, and more specifically within enclosed volume 226 defined by inner wall 208, sealing member 220 and second and third flanges 214, 218. Typical values of oxygen can be from about 0.01% to about 1%, water from about 2% to about 20%, with the balance of the gas being nitrogen (or another inert gas like argon). The gas system could be run as high as about 21% oxygen and have a dew point as high as about 200° F. A gas system with about 0.01% oxygen and about 20% water at about a 200° F. dew point can give a range of hydrogen from about 1 to about 38,000 ppm at about 1700° C. Alternatively, the mixture of gases introduced into the volume defined above may include hydrocarbons (and oxygen), ammonia, cracked ammonia products and/or combustion products. As previously described, control system 136 may be a closed loop control system.

Connecting tube assembly 200 may further include a third refractory insulating material 238 positioned within the gap between inner wall 208 and outer wall 210 of conduit 202. Third refractory insulating material 238 should be capable of resisting degradation at high temperature and exhibit high structural strength to avoid collapse of the inner and outer walls of conduit 202. A suitable third refractory insulating material may be, for example, a high alumina content material such as Alundum AN485, manufactured by Saint-Gobain. However, any suitable refractory insulating material that meets the thermal and structural needs of the apparatus may be used.

Third flange 218, and optionally second flange 214, may be provided with a cooling tube 240 configured to receive a flow of cooling fluid through an interior passage of the cooling tube. For example, each cooling tube 240 may extend around at least a portion of, or all of, an outer perimeter of the second or third flanges 214, 218. Cooling of at least third flange 218 functions to form a glass seal 148 between conduit 202 (i.e., third flange 218) and an adjacent vessel, for example a second conduit 140 comprising a terminal flange 142. Molten glass leaking between the adjacent flanges cools and solidifies into glass seal 148, thereby preventing a continued flow of molten glass between the two adjacent flanges 218, 142. It should also be apparent that the cooling tubes further function to cool the flange or flanges, which may be heated by the electric current, thereby preventing thermal damage to the flanges.

Figure 6:
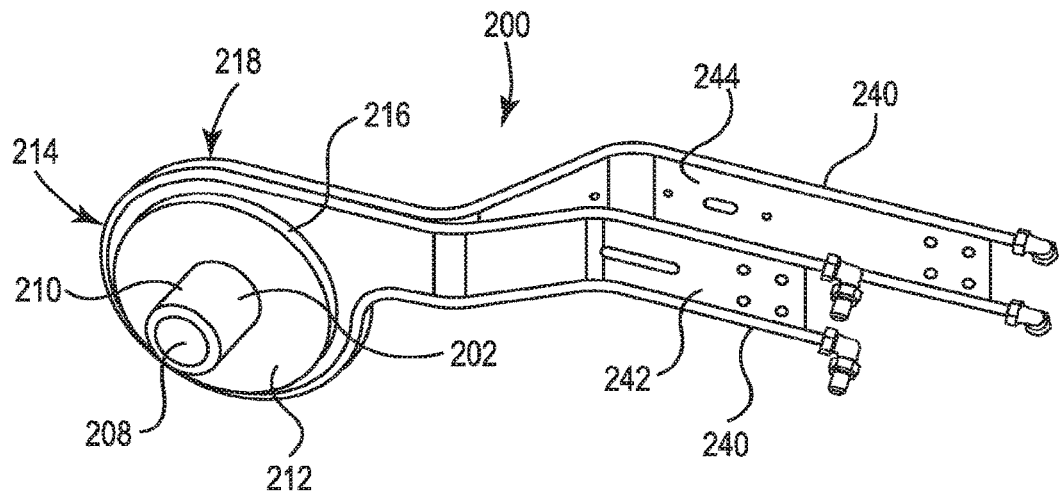
FIG. 6 is a perspective view of a connecting tube assembly according to FIG. 4 as seen from one side of the connecting tube assembly.
Figure 7:
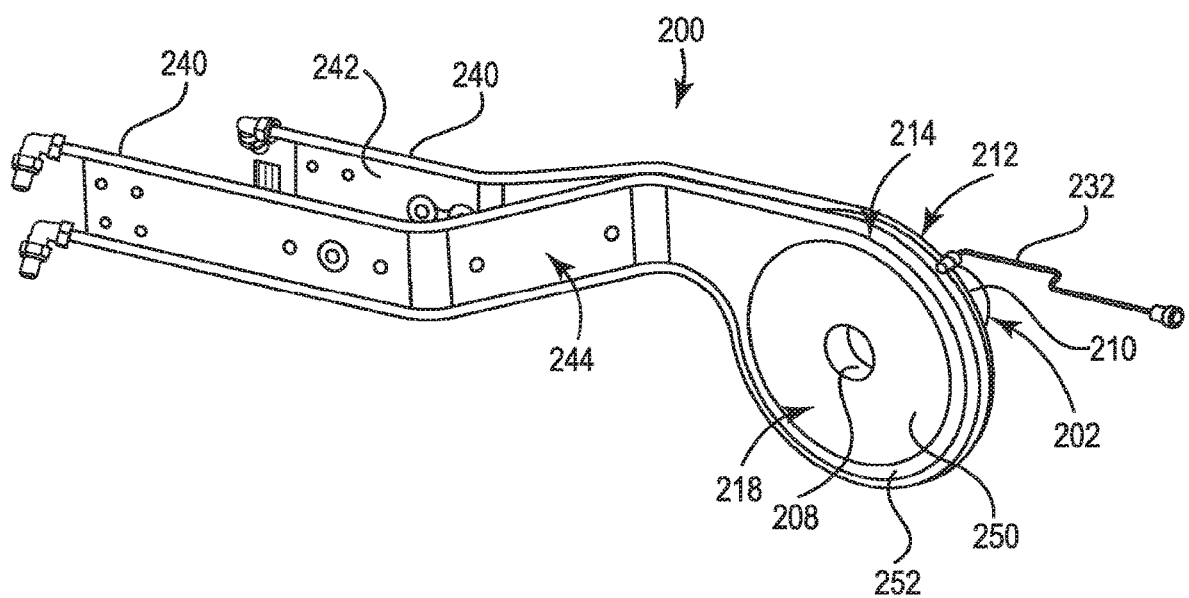
FIG. 7 is a perspective view of the connecting tube assembly according to FIG. 5 as seen from the opposite side of the connecting tube assembly.

In some embodiments second and third flanges 214, 218 may be configured to conduct an electric current into and through conduit 202. Accordingly, and as best seen in FIGS. 6 and 7, each of second and third flanges 214, 218 may include an electrode portion 242, 244 (respectively) in electrical contact with a source of electric current (not shown). Since second flange 214 is joined to outer wall 210 of conduit 202, and more specifically at an end of outer wall 210, and third flange 218 is joined to inner wall 208 of conduit 202, and more specifically an end of inner wall 208, and with the exception of first end 204 of conduit 202, inner wall 208 and outer wall 210 are separated by a gap. Electric current supplied to second and third flanges 214, 218 flows between the second and third flanges through substantially the entirety of inner and outer walls 208, 210, thereby heating conduit 202 (and molten glass therein). It should be apparent that, if desired, the second and third flanges could be positioned such that not all of conduit 202 is electrically heated. Additionally any one or both of second flange 214 and third flange 218 may comprise a first (inner) ring extending around conduit 202, and an second (outer) ring extending around the first ring. The first ring may, in some embodiments, be an innermost ring and in direct contact with conduit 202. Similarly, the second ring may be an outermost ring and be in direct contact with a respective electrode portion.

Accordingly, in certain embodiments, second flange 214 may comprise a first ring 246 that is an innermost ring in direct contact with outer wall 210. Second flange 214 may further include a second ring 248 that is an outermost ring and extends around first ring 246. Second ring 248 can be in direct contact with first ring 246 such that second ring 248 is joined to an outer periphery of first ring 246. In other embodiments, second flange 214 may include intermediate rings between first ring 246 and second ring 248. Because first ring 246 may be in close proximity to conduit 202, in some embodiments first ring 246 may be formed from a high temperature precious metal, for example a platinum group metal selected from the group consisting of platinum, rhodium, iridium, palladium, osmium, ruthenium and alloys thereof. In certain embodiments, first ring 246 may be formed from a platinum-rhodium alloy. In specific examples the platinum-rhodium alloy may comprise platinum in an amount ranging from about 70% to 90% by weight, and may further comprise rhodium in an amount ranging from about 10% to about 30% by weight. However, because second ring 248 is positioned farther from conduit 202 than first ring 246, second ring 248 may be formed from a less expensive metal that is capable of withstanding moderate temperatures and not necessarily the high temperature of the molten glass flowing through conduit 202 (in some glass manufacturing processes, the molten glass exiting the melting vessel can exceed 1500° C.). Accordingly, in some embodiments, second ring 248 may be formed from nickel, molybdenum or other metal with similar conductivity and melting point. Second ring 248 may have a thickness that is greater than the thickness of first ring 246. The aforementioned intermediate rings may be formed from either a precious metal, for example the precious metal of the first ring, or another metal, such as the metal of the second ring, wherein the second ring is the outermost ring. However, in further embodiments the intermediate ring or rings may comprise a different metal than the first or second rings.

In certain embodiments, third flange 218 may comprise a first ring 250 that is an innermost ring in direct contact with outer wall 210. Third flange 218 may further include a second ring 252 that may be an outermost ring and extends around first ring 250. Second ring 252 can be in direct contact with first ring 250 such that second ring 252 is joined to an outer periphery of first ring 250. In other embodiments, third flange 218 may include intermediate rings between first ring 250 and second ring 252. Because first ring 250 may be in close proximity to conduit 202, in some embodiments, first ring 250 may be formed from a high temperature precious metal, for example a platinum group metal selected from the group consisting of platinum, rhodium, iridium, palladium, osmium, ruthenium and alloys thereof. In certain embodiments, first ring 250 may be formed from a platinum-rhodium alloy. In specific examples the platinum-rhodium alloy may comprise platinum in an amount ranging from about 70% to 90% by weight, and may further comprise rhodium in an amount ranging from about 10% to about 30% by weight. However, because second ring 252 is positioned farther from conduit 202 than first ring 250, second ring 252 may be formed from a less expensive metal that is capable of withstanding moderate temperatures and not necessarily the high temperature of the molten glass flowing through conduit 202 (in some glass manufacturing processes, the molten glass exiting the melting vessel can exceed 1500° C.). Accordingly, in some embodiments, second ring 252 may be formed from nickel, molybdenum or other similar metal. Second ring 252 may have a thickness that is greater than the thickness of first ring 250. The aforementioned intermediate rings may be formed from either a precious metal, for example the precious metal of the first ring, or another metal, such as the metal of the second ring, wherein the second ring is the outermost ring. However, in further embodiments the intermediate ring or rings may comprise a different metal than the first or second rings.

Second and third flanges 214, 218 may be coupled one to the other by a plurality of fasteners 254, e.g., bolts or screws or the like, wherein the coupling can function to compress fibrous material 232 against sealing material 220 and thereby enhance the sealing. For example, in the embodiments illustrated in FIG. 4, second ring 252 of third flange 218 comprises openings through which fasteners 254 extend. An electrically insulating bushing 256 is positioned around each fastener and is inserted into the opening such that each fastener 254 is electrically insulated from third flange 218. Second flange 214 includes complimentary threaded openings into which each fastener 254 can be threaded (it should be apparent that electrical insulators are required only at one end of each fastener). It should be clear that in other embodiments the position of the fasteners may be interchanged so that the third flange 218 comprises threaded passages. The use of electrically insulated fasteners facilitates the tightening of the fasteners, and the subsequent compression of fibrous material 232 and sealing of sealing member 220 to second and third flanges 214 and 218, without producing an electrical short between the second and third flanges 214 and 218.

Figure 8:
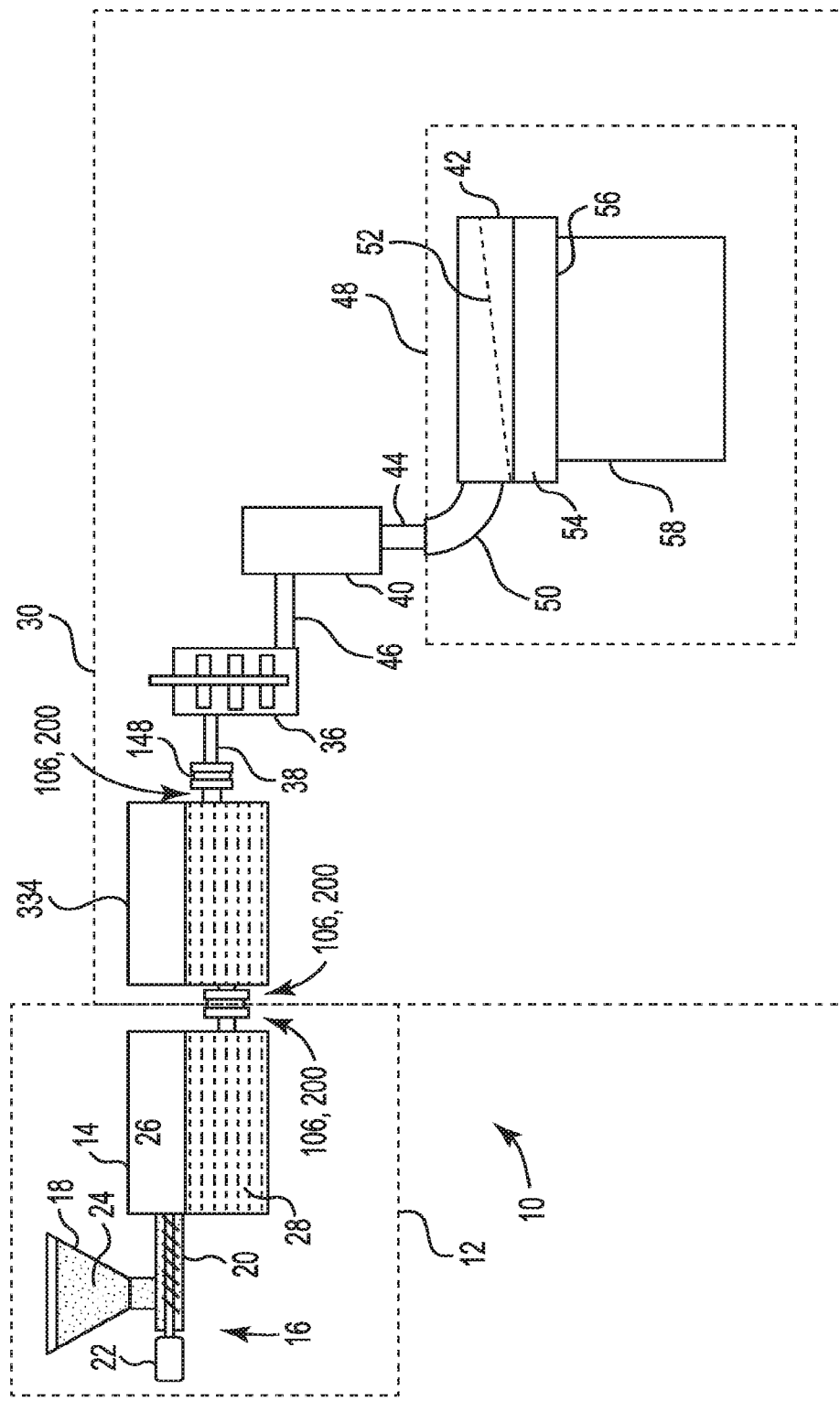
FIG. 8 is schematic view of another example glass making process in accordance with an embodiment of the present disclosure.

It should be apparent from the foregoing description that connecting tube assemblies as disclosed herein can be used in a variety of glass manufacturing systems. For example, FIG. 8 illustrates another glass manufacturing apparatus 10 comprising a refractory fining vessel 334, e.g., a refractory ceramic fining vessel, wherein glass manufacturing apparatus 10 comprises a plurality of connecting tube assemblies (e.g. connecting tube assembly 106 and/or connecting tube assembly 200) either entering or leaving (or both), the refractory vessels (e.g., melting vessel 14 or fining vessel 334).

Figure 9:
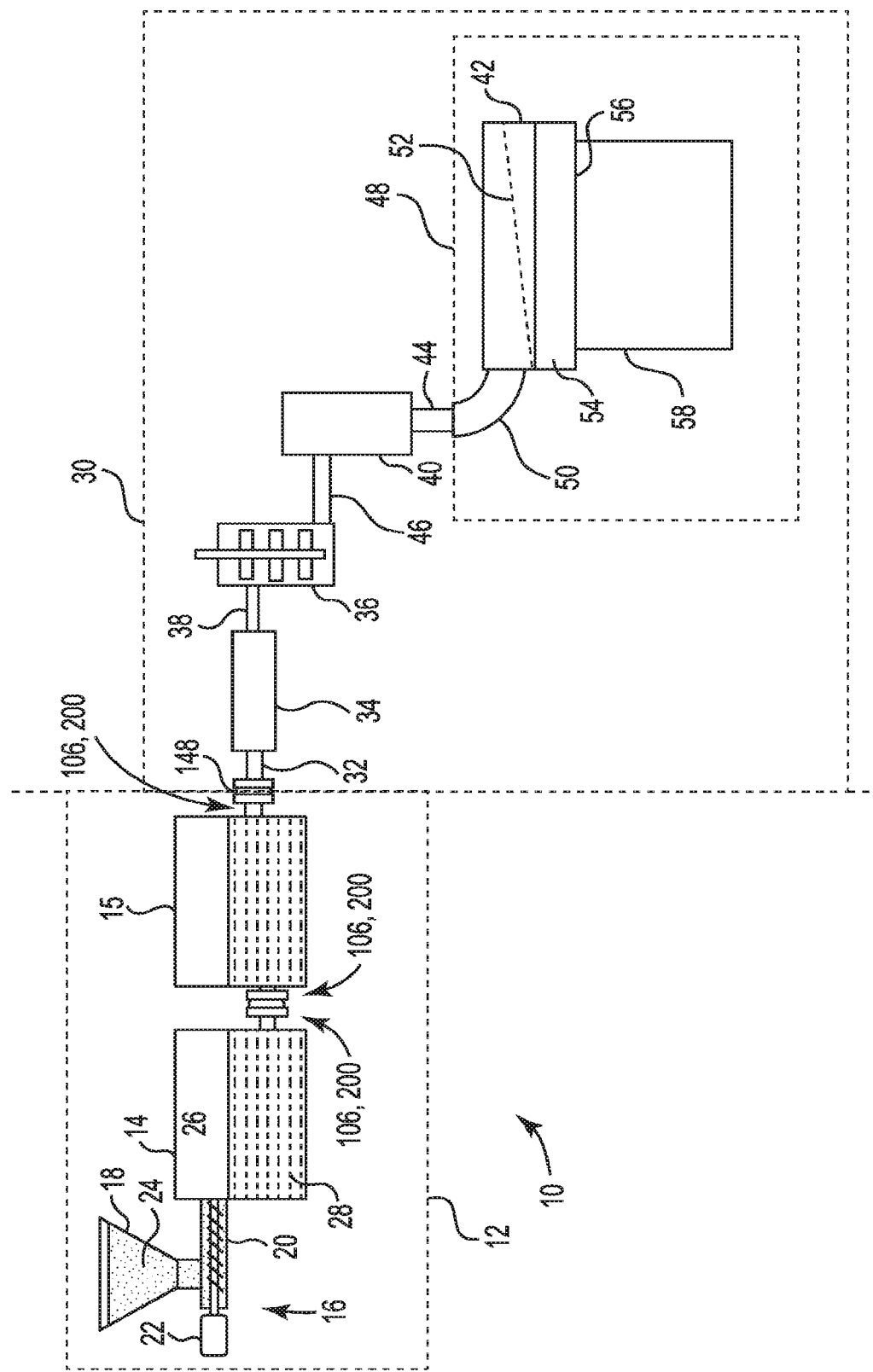
FIG. 9 is schematic view of still another example glass making process in accordance with an embodiment of the present disclosure.

In still another embodiment shown in FIG. 9, glass manufacturing apparatus 10 is illustrated, wherein glass melting furnace 12 comprises a second melting vessel 15 connected in series with and downstream from melting vessel 14 and upstream from fining vessel 34. Second melting vessel 15 may be at a temperature equal to or less than melting vessel 14. Glass melting vessel 15 is typically comprised of refractory material, such as a refractory ceramic material. In some examples glass melting vessel 15 may be constructed from refractory ceramic bricks, for example refractory ceramic bricks comprising alumina or zirconia. As in the instance of FIG. 8, the glass manufacturing apparatus 10 of FIG. 9 comprises a plurality of connecting tube assemblies (e.g. connecting tube assembly 106 and/or connecting tube assembly 200) either entering or leaving (or both), the refractory vessels (e.g., melting vessel 14 or melting vessel 15).

It will be apparent to those skilled in the art that various modifications and variations can be made to embodiments of the present disclosure without departing from the spirit and scope of the invention. Thus, it is intended that the present disclosure cover the modifications and variations of such embodiments provided they come within the scope of the appended claims and their equivalents.

What is claimed is:

1. An apparatus for conditioning molten glass comprising:
a conduit extending through a wall of a refractory vessel;
a first flange joined to the conduit;
a second flange joined to the conduit and spaced apart from the first flange such that the first flange is positioned between the second flange and the vessel;
a sealing member sealed to the first and second flanges around outer edge regions thereof to form an enclosed volume; and
a first refractory insulating material positioned within the enclosed volume,
the apparatus further comprising a gas delivery tube extending through the sealing member, the gas delivery tube configured to supply a gas to the enclosed volume.

2. The apparatus according to claim 1, wherein the sealing member comprises a metal band.

3. The apparatus according to claim 2, wherein the metal band comprises platinum.

4. The apparatus according to claim 1, wherein the first flange and the second flange comprise platinum.

5. The apparatus according to claim 1, wherein the second flange comprises a cooling tube extending around a perimeter thereof, the cooling tube comprising a passage configured to receive a flow of cooling fluid.

6. The apparatus according to claim 1, further comprising a fibrous material positioned between the sealing member and the first refractory insulating material.

7. The apparatus according to claim 1, wherein the refractory vessel is a melting furnace.

8. The apparatus according to claim 1, wherein the refractory vessel is a fining vessel.

9. An apparatus for conditioning molten glass comprising:
a refractory vessel;
a conduit extending through a wall of the refractory vessel, the conduit comprising an outer wall and an inner wall, the inner wall joined to the outer wall at a first end of the outer wall and spaced apart from the outer wall at an opposite end of the outer wall;
a first flange coupled to the outer wall of the conduit and positioned adjacent the refractory vessel;
a second flange coupled to the outer wall of the conduit and spaced apart from the first flange, the first flange positioned between the second flange and the vessel;
a first refractory insulating material positioned between the first flange and the second flange;
a third flange coupled to the inner wall of the conduit and spaced apart from the second flange, the second flange positioned between the first flange and the third flange;
a second refractory insulating material positioned between the second flange and the third flange; and
a sealing member disposed between the second flange and the third flange, thereby forming an enclosed volume, the apparatus further comprising a gas supply tube extending through the sealing member and configured to supply a gas to the enclosed volume.

10. The apparatus according to claim 9, further comprising a third refractory insulating material positioned between the inner wall of the conduit and the outer wall of the conduit.

11. The apparatus according to claim 9, further comprising a fibrous insulating material positioned between the sealing member and the second flange and the third flange.

12. The apparatus according to claim 9, further comprising a first cooling member coupled to the third flange and configured to receive a flow of cooling fluid through a passage of the cooling member.

13. The apparatus according to claim 12, further comprising a second cooling member coupled to the second flange and configured to receive a flow of cooling fluid through a passage of the cooling member.

14. The apparatus according to claim 9, wherein the second flange is in electrical communication with an electrical power supply.

15. The apparatus according to claim 9, wherein the third flange is in electrical communication with an electrical power supply.

16. The apparatus according to claim 9, wherein the second flange comprises a plurality of rings, wherein an inner ring is attached to the outer wall of the conduit and an outer ring is disposed around the inner ring.

17. The apparatus according to claim 16, wherein the inner ring comprises platinum.

18. The apparatus according to claim 16, wherein the outer ring comprises nickel.

* * * * *